United States Patent [19]

Creech, Jr.

[11] Patent Number: 4,884,871

[45] Date of Patent: Dec. 5, 1989

[54] METER READING AID

[76] Inventor: Charles M. Creech, Jr., 5833 Creola Rd., Charlotte, N.C. 28226

[21] Appl. No.: 231,997

[22] Filed: Aug. 15, 1988

[51] Int. Cl.$^4$ .............................................. G02B 5/00
[52] U.S. Cl. ..................................... 350/319; 350/314
[58] Field of Search .................................. 350/319, 114

[56] References Cited

U.S. PATENT DOCUMENTS

| | | | |
|---|---|---|---|
| 3,499,698 | 3/1970 | Malys | 350/114 |
| 4,215,916 | 8/1980 | Bell et al. | 350/319 |
| 4,515,437 | 5/1985 | Story | 350/114 |
| 4,602,846 | 7/1986 | Karnes | 350/114 |
| 4,643,523 | 2/1987 | Smedley et al. | 350/319 |

Primary Examiner—Bruce Y. Arnold
Assistant Examiner—Loha Ben
Attorney, Agent, or Firm—Daniel E. McConnell

[57] ABSTRACT

This invention relates to a device for facilitating the reading of submerged water meters. The device has an elongate, thin wall member of generally right circular cylindrical cross sectional configuration for forming a viewing tube for permitting viewing through air of a submerged meter face, and a transparent, flexible closure closing one end of the tube for engaging a submerged meter face and conforming to the surface of an engaged face for expelling water from between an engaged face and the closure upon imposition on the tube of a force directed longitudinally thereof.

6 Claims, 1 Drawing Sheet

U.S. Patent    Dec. 5, 1989    4,884,871
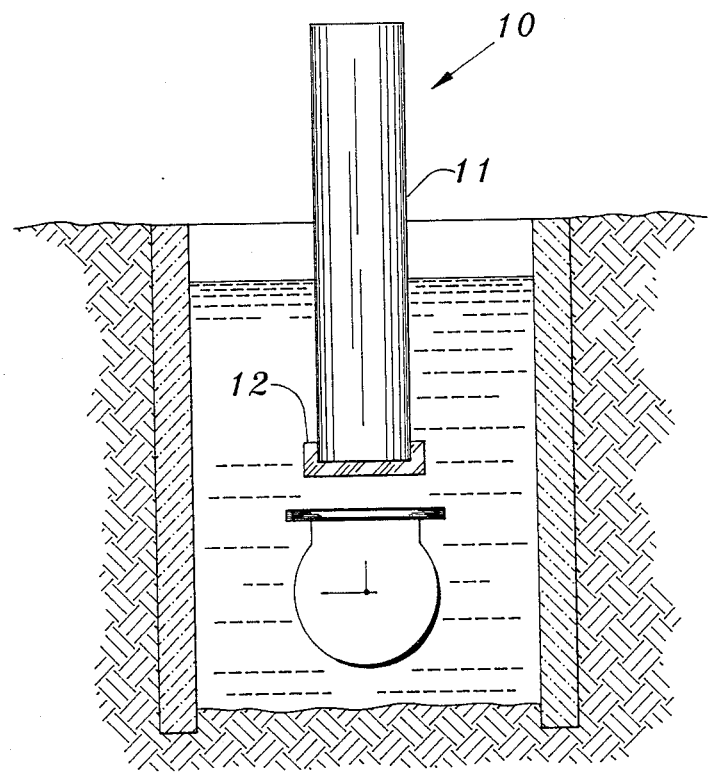
FIG. 1
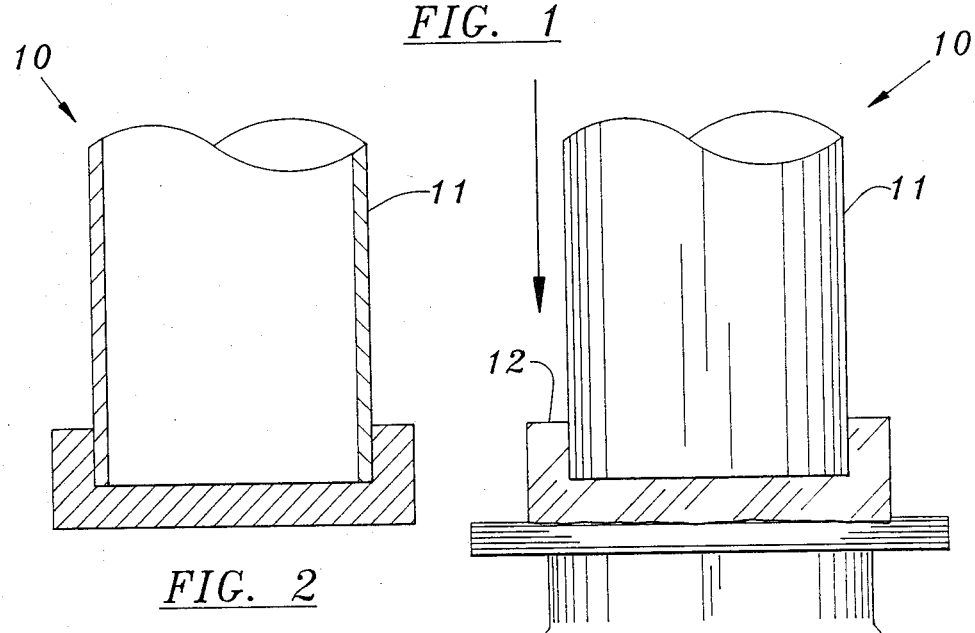
FIG. 2
FIG. 3

4,884,871

METER READING AID

FIELD AND BACKGROUND OF THE INVENTION

This invention relates to a device for facilitating the reading of submerged water meters.

The problem of reading a submerged water meter has been recognized heretofore, and various solutions have been proposed. Certain of those solutions, such as those disclosed in Bell et al U.S. Pat. No. 4,215,916; Story U.S. Pat. No. 4,515,437; and Karnes U.S. Pat. No. 4,602,846, teach the use of underwater viewing devices of the types known at one time as hydroscopes. That is, the devices have tubular bodies closed at one end by a window. When inserted into the water filled meter box containing a submerged meter, the tube permits viewing the meter face to be read through air and the transparent window.

Such devices may function quite well in areas where the water filling a meter box is substantially clear. However, that is rarely the case and the turbidity caused by solids suspended in the water filling a meter box so limits the usefulness of such devices that they have not come into general use.

BRIEF DESCRIPTION OF THE INVENTION

With the foregoing in mind, it is an object of this invention to improve upon prior devices for reading submerged meters by providing a meter reading aid which is effective with water having turbidity so high that even a small quantity of the water will prevent reading a meter. In realizing this object of the invention, provision is made for expelling water otherwise trapped between the aid and the meter face to be read.

Yet a further object of the invention is the provision of a meter reading aid having a window through which a meter face is to be read which is formed of a transparent, resilient material such that the face of the window which is to engage the meter face to be read will conform to the meter face and thereby expel all water from between the window and the meter face.

BRIEF DESCRIPTION OF THE DRAWINGS

Some of the objects of the invention having been stated, other objects will appear as the description proceeds, when taken in connection with the accompanying drawings, in which:

FIG. 1 is an elevation view of the meter reading aid of this invention in use in reading a submerged meter;

FIG. 2 is an enlarged, sectional view through a portion of the meter reading aid of FIG. 1; and FIG. 3 is an enlarged view of the aid of this invention in engagement with the face of a meter to be read.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawing, the device of the present invention is there shown and generally indicated at 10. The meter reading aid of this invention has essentially only two major components; a viewing tube means indicated at 11 and a closure means for one end of the viewing tube which is indicated at 12.

The viewing tube 11 defines an open cylindrical volume for permitting viewing through air of a submerged meter. In the form illustrated, the tube 11 is a thin wall member of right circular cylindrical cross sectional configuration. The tube may be made of metal, plastic, or any such suitable material having the strength to sustain a pushing force imposed by a user.

The closure 12 is transparent and flexible and closes one end of the means for engaging a face of a submerged meter and conforming to the surface of an engaged face for thereby expelling water from between an engaged face and the closure. The closure 12 has an exposed, exterior face which is substantially planar and generally circular in configuration in the plane of said exterior face. Preferably, the closure has an outside diameter which is smaller than the inside diameter of the submerged faces of meters to be read and has an area less than the area of the submerged face of a submerged meter which is to be engaged during reading of a meter.

In use, the aid of this invention is thrust into a water filled meter box (FIG. 1) and pushed downwardly into engagement with the submerged face of the meter to be read. With this pushing force, the window 12 is brought forcefully into engagement with the meter face and the resilient or flexible material of the window conforms to the face of the meter (FIG. 3), thereby expelling water from between the aid and the meter and making it possible to read the meter regardless of the turbidity of the water filling the meter box.

In the drawings and specifications there has been set forth a preferred embodiment of the invention and, although specific terms are used, the description thus given uses terminology in a generic and descriptive sense only and not for purposes of limitation.

What is claimed is:

1. A device for reading submerged meters comprising:
    viewing tube means defining an open cylindrical volume for permitting viewing of a submerged meter through air in said volume, and
    transparent, flexible closure means closing one end of said tube means for engaging a face of said submerged meter and conforming to the surface of said face upon imposition on said tube means of a force directed longitudinally thereof for thereby expelling water from between said face and said closure means.

2. Apparatus according to claim 1 wherein said tube means is a thin wall member of right circular cylindrical cross sectional configuration.

3. Apparatus according to claim 1 wherein said closure means has an exposed, exterior face which is substantially planar and generally circular in configuration in the plane of said exterior face.

4. Apparatus according to claim 3 wherein said closure means has an outside diameter which is smaller than the inside diameter of submerged faces of meters to be read.

5. Apparatus according to claim 1 wherein said closure means has an exposed, exterior face which is substantially planar and has an area less than the area of said face of said submerged meter.

6. A device for reading submerged meters comprising:
- an elongate, thin wall member of generally right circular cylindrical cross sectional configuration for forming a viewing tube means defining an open cylindrical volume for permitting viewing of a submerged meter face through air in said volume, and
- transparent, flexible closure means closing one end of said tube means for engaging said submerged meter face and conforming to the surface of said submerged meter face for expelling water from between an engaged face and said closure means upon imposition on said tube means of a force directed longitudinally thereof.

* * * * *